US011126626B2

(12) United States Patent
Petride et al.

(10) Patent No.: US 11,126,626 B2
(45) Date of Patent: Sep. 21, 2021

(54) MASSIVELY PARALLEL AND IN-MEMORY EXECUTION OF GROUPING AND AGGREGATION IN A HETEROGENEOUS SYSTEM

(71) Applicant: Oracle International Corporation, Redwood Shores, CA (US)

(72) Inventors: Sabina Petride, Hayward, CA (US); Sam Idicula, Santa Clara, CA (US); Nipun Agarwal, Saratoga, CA (US)

(73) Assignee: Oracle International Corporation, Redwood Shores (CA)

( * ) Notice: Subject to any disclaimer, the term of this patent is extended or adjusted under 35 U.S.C. 154(b) by 367 days.

(21) Appl. No.: 16/272,829

(22) Filed: Feb. 11, 2019

(65) Prior Publication Data
US 2019/0188205 A1 Jun. 20, 2019

Related U.S. Application Data

(63) Continuation of application No. 13/831,122, filed on Mar. 14, 2013, now Pat. No. 10,204,140.

(51) Int. Cl.
*G06F 16/2455* (2019.01)
(52) U.S. Cl.
CPC .. *G06F 16/24556* (2019.01); *G06F 16/24553* (2019.01)
(58) Field of Classification Search
CPC .. G06F 16/182; G06F 16/2453; G06F 16/178; G06F 16/24556; G06F 16/24553
See application file for complete search history.

(56) References Cited

U.S. PATENT DOCUMENTS

| 4,769,772 A | 9/1988 | Dwyer |
| 5,247,664 A | 9/1993 | Thompson et al. |
| 5,511,186 A | 4/1996 | Carhart et al. |
| 5,761,653 A | 6/1998 | Schiefer |
| 5,778,354 A | 7/1998 | Leslie et al. |
| 5,943,666 A | 8/1999 | Kleewein et al. |

(Continued)

OTHER PUBLICATIONS

Iyer, "Hardware Assisted Sorting in IBM's DB2 DBMS", 2005, Computer Society of India. (Year: 2005).*

(Continued)

*Primary Examiner* — Apu M Mofiz
*Assistant Examiner* — Sheryl L Holland
(74) *Attorney, Agent, or Firm* — Hickman Becker Bingham Ledesma LLP

(57) ABSTRACT

A system and method for processing a group and aggregate query on a relation are disclosed. A database system determines whether assistance of a heterogeneous system (HS) of compute nodes is beneficial in performing the query. Assuming that the relation has been partitioned and loaded into the HS, the database system determines, in a compile phase, whether the HS has the functional capabilities to assist, and whether the cost and benefit favor performing the operation with the assistance of the HS. If the cost and benefit favor using the assistance of the HS, then the system enters the execution phase. The database system starts, in the execution phase, an optimal number of parallel processes to produce and consume the results from the compute nodes of the HS. After any needed transaction consistency checks, the results of the query are returned by the database system.

20 Claims, 11 Drawing Sheets

(56) References Cited

U.S. PATENT DOCUMENTS

| | | | |
|---|---|---|---|
| 5,978,789 | A | 11/1999 | Griffin et al. |
| 6,112,198 | A | 8/2000 | Lohman et al. |
| 6,257,818 | B1 | 7/2001 | Subramanian et al. |
| 6,757,677 | B2 | 6/2004 | Pham et al. |
| 6,954,776 | B1 | 10/2005 | Cruanes et al. |
| 6,980,988 | B1 | 12/2005 | Demers et al. |
| 7,206,805 | B1 | 4/2007 | McLaughlin |
| 7,233,939 | B1 | 6/2007 | Ziauddin |
| 7,383,247 | B2 | 6/2008 | Li et al. |
| 7,617,179 | B2 | 11/2009 | Nica |
| 7,636,735 | B2 | 12/2009 | Haas et al. |
| 8,244,718 | B2 | 8/2012 | Chamdani et al. |
| 8,442,971 | B2 | 5/2013 | Bestgen et al. |
| 8,918,388 | B1 | 12/2014 | Chen |
| 2003/0037048 | A1 | 2/2003 | Kabra |
| 2003/0100960 | A1 | 5/2003 | Edwards et al. |
| 2004/0220923 | A1 | 11/2004 | Nica |
| 2004/0260684 | A1 | 12/2004 | Agrawal |
| 2005/0278368 | A1 | 12/2005 | Benedikt |
| 2006/0020616 | A1* | 1/2006 | Hardy .............. G06F 16/316 |
| 2006/0182046 | A1 | 8/2006 | Dageville et al. |
| 2006/0218123 | A1* | 9/2006 | Chowdhuri ....... G06F 16/24532 |
| 2006/0294162 | A1 | 12/2006 | Makansi et al. |
| 2007/0067274 | A1 | 3/2007 | Han et al. |
| 2007/0073642 | A1 | 3/2007 | Ghosh et al. |
| 2007/0162425 | A1 | 7/2007 | Betawadkar-Norwood |
| 2008/0114803 | A1 | 5/2008 | Chinchwadkar et al. |
| 2009/0043750 | A1 | 2/2009 | Barsbess et al. |
| 2009/0083219 | A1 | 3/2009 | Zane et al. |
| 2009/0271385 | A1 | 10/2009 | Krishnamoorthy et al. |
| 2009/0300465 | A1* | 12/2009 | Wu .................... G11C 11/5642 714/763 |
| 2010/0169381 | A1 | 7/2010 | Faunce et al. |
| 2010/0205170 | A1 | 8/2010 | Barsness et al. |
| 2010/0306219 | A1 | 12/2010 | Sthanikam et al. |
| 2011/0302151 | A1 | 12/2011 | Abadi et al. |
| 2011/0302583 | A1 | 12/2011 | Abadi et al. |
| 2012/0036167 | A1 | 2/2012 | Hernstadt |
| 2012/0191639 | A1 | 7/2012 | Katahira et al. |
| 2012/0310916 | A1 | 12/2012 | Adadi et al. |
| 2013/0151889 | A1 | 6/2013 | Markus |
| 2014/0101205 | A1 | 4/2014 | Idicula et al. |
| 2014/0280037 | A1 | 9/2014 | Petride et al. |
| 2014/0280298 | A1 | 9/2014 | Petride et al. |
| 2015/0012486 | A1 | 1/2015 | Idicula et al. |
| 2019/0102346 | A1 | 4/2019 | Wang et al. |
| 2020/0394191 | A1 | 12/2020 | Fender |
| 2020/0394192 | A1 | 12/2020 | Fender |

OTHER PUBLICATIONS

Ozcan, et al., "Emerging Trends in the Enterprise Data Analytics: Connecting Hadoop and DB2 Warehouse", 2011, ACM. (Year: 2011).*

Palkar, et al., "Filter Before You Parse: Faster Analytics on Raw Data with Sparser", Proceedings of the VLDB Endowment, vol. 11, No. 11, dated 2018, 14 pages.

Mustard et al., "JumpGate: Towards In-Network Data Processing", dated 2019, 3 pages.

Kornacker et al., "Impala: A Modern, Open-Source SQL Engine for Hadoop", 7th Biennial Conference on Innovative Data Systems Research (CIDR'15) dated Jan. 4-7, 2015, 10 pages.

Balkesen et al., "RAPID: In-Memory Analytical Query Processing Engine with Extreme Performance perWatt", SIGMOD'18, Jun. 10-15, 2018, Houston, TX, USA, 13 pages.

Agrawal et al., "A Many-core Architecture for In-Memory Data Processing", MICRO-50, Oct. 14-18, 2017, Cambridge, MA, USA, 14 pages.

U.S. Appl. No. 13/645,030, filed Oct. 4, 2012, Final Office Action, dated Mar. 6, 2014.

U.S. Appl. No. 13/645,030, filed Oct. 4, 2012, Office Aciton, dated Nov. 4, 2013.

U.S. Appl. No. 13/831,279, filed Mar. 14, 2013, Office Action, dated Dec. 2, 2014.

U.S. Appl. No. 13/831,279, filed Mar. 14, 2013, Notice of Allowance, dated May 18, 2015.

U.S. Appl. No. 13/831,122, filed Mar. 14, 2013, Office Action, dated Jul. 1, 2016.

U.S. Appl. No. 13/831,122, filed Mar. 14, 2013, Office Action, dated Mar. 27, 2015.

U.S. Appl. No. 13/831,122, filed Mar. 14, 2013, Final Office Action, dated Nov. 18, 2016.

U.S. Appl. No. 13/831,122, filed Mar. 14, 2013, Final Office Action, dated Sep. 22, 2015.

U.S. Appl. No. 13/645,030, filed Oct. 4, 2012, Notice of Allowance, dated May 28, 2014.

Petride, U.S. Appl. No. 13/831,122, filed Mar. 14, 2013, Notice of Allowance, dated Sep. 18, 2018.

Petride, U.S. Appl. No. 13/831,122, filed Mar. 14, 2013, Interview Summary, dated Nov. 8, 2017.

Petride, U.S. Appl. No. 13/831,122, filed Mar. 14, 2013, Final Office Action, dated Nov. 18, 2016.

Petride, U.S. Appl. No. 13/831,122, filed Mar. 14, 2013, Examiners Answers, dated Nov. 8, 2017.

Petride, U.S. Appl. No. 13/831,122, filed Mar. 14, 2013, Decision on Appeal, dated Sep. 7, 2018.

Petride, U.S. Appl. No. 13/831,122, filed Mar. 14, 2013, Advisory Action, dated Mar. 31, 2017.

Fender, U.S. Appl. No. 16/442,015, filed Jun. 14, 2019, Notice of Allowance, dated Jan. 14, 2021.

Kossmann D., "The State of the Art in Distributed Query Processing" ACM Computing Surveys, ACM, New York, NY, dated Dec. 2000, 48 pages.

Bajda-pawlikowski et al., "Efficient Processing of Data warehousing queries in a split execution environment", Procceeding Sigmod, dated 2011, dated Jun. 12, 2011, 6 pages.

Chamberlin et al., "Dynamic Data Distribution (D3) in a Shared-Nothing Multiprocessor Data Store", dated 1992, VLDB Conference.

Cieslewicz et al., "Adaptive Aggregation on Chip Multiprocessors", VLDB, dated Sep. 23-28, 2007, 12 pages.

Cruanes et al., "Parallel SQL Execution in Oracle 10g" SIGMOD, dated Jun. 13-18, 2004, 5 pages.

D. Kossmann, "The State of the Art in Distributed Query Processing", dated 1996, ACM, 48 pages.

Davidson et al., "Consistency in Partitioned Networks" dated 1985, ACM, 30 pages.

DeWitt et al., "Parallel Database Systems: The Future of High Performance Database Systems", Communications of the ACM, dated Jun. 1992, vol. 35, No. 6, 14 pages.

DeWitt, D., and R. Gerber, Multiprocessor Hash-Based Join Algorithms, Proceedings of the 1985 VLDB Conference, Stockholm, Sweden, dated Aug. 1985, 14 pages.

"The Oracle Optimizer Explain Plan", dated May 2011, Oracle, 30 pages.

Graefe et al., "Hash Joins and Hash Teams in Microsoft SQL Server", dated 1998, VLDB Conference.

Yu et al., "DryadLINQ: A System for General-Purpose Distributed Data Distributed Data-Parallel Computing Using a High-Level Lanuage", dated 2009, 8th USENIX Symposium on Operating Syhstems Design.

Kossmann et al., "Cache Investment: Integrating Query Optimization and Distributed Placement" dated 2001, ACM, 42 pages.

Morton et al., "A Process Estimator for Map Reduce Pipelines", dated 2011, Univeristy of Washington, 9 pages.

Oracle RAC: "Architecture and Performance", Angelo Pruscino, Industrial Paper, SIGMOD, dated 2003.

Oracle, Exadata, "A Technical Overview of the Oracle Exadata Database Machine and Exadata Storage Server", An Oracle White Paper, dated Jun. 2012, 36 pages.

Oracle, Oracle White Paper, "Oracle Database Parallel Execution Fundamentals" dated Oct. 2010, 33 pages.

Oveview of the Oracle Exadata Database Machine and Exadata Storage Server: http://www.oracle.com/technetwork/database/exadata/exadata-technical-whitepaper-134575.pdf, dated Jun. 2012, 36 pages.

(56) References Cited

OTHER PUBLICATIONS

Schneider, D. and D. DeWitt, A Performance Evaluation of Four Parallel Join Algotithms in a Shared-Nothing Multiprocessor Environment, Proceedings of the 1989 SIGMOD, dated Jun. 1989, 12 pages.

Shatdal et al., "Adaptive Parallel Aggregation Algorithms", dated 1995, 11 pages.

Ye et al., "Scalable Aggregation on Multicore Processors", AMC, dated Jun. 13, 2011, 9 pages.

Franklin et al., "Performance Tradeoffs for Client-Server Query Processing" dated 1996, ACM, 12 pages.

\* cited by examiner

MASSIVELY PARALLEL AND IN-MEMORY EXECUTION OF GROUPING AND AGGREGATION IN A HETEROGENEOUS SYSTEM

CROSS-REFERENCE TO RELATED APPLICATIONS; BENEFIT CLAIM

This application claims the benefit as a continuation of application Ser. No. 13/831,122, filed Mar. 14, 2013 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present application relates generally to the processing of SQL queries and in particular to the processing of a group-and-aggregate query with the assistance of a heterogeneous system.

BACKGROUND

One of the core SQL operations is a group-and-aggregation operation. As the name suggests, two operations are involved. The group operation groups together all rows in a relation that share the same keys (columns). The aggregate operation aggregates values of non-key columns of the relation within each group. Some group-and-aggregate operations specify a set of filters to be applied on the relations before the grouping operation on the relation, which can be materialized.

An example of a group and aggregate operation is:

```
select   d.DEPTNO
        ,d.NAME
        ,count(e.EMPNO)      as NUM_EMP
        ,nvl(sum(e.MSAL),o)  as SUM_MSA
from    DEPT d
       ,EMP e
where    d.DEPTNO = e.DEPTNO (+)
group by d.DEPTNO, d.DNAME
```

This SQL statement joins a department table d and an employee table e, groups the rows by department number DEPTNO and department name DNAME, and counts the number of employees NUM_EMP and the sum of their salaries e.MSAL into SUM_MSA. This query has the form of select AggFunc from R group by K, where AggFunc includes the count and sum functions, R is the relation with the department and employ tables, and K includes the two columns department name and department number.

Currently database implementations of group-and-aggregate queries, such as the one above, use the classical iterator-based technique for serial evaluation of a query. The iterator technique includes opening a row source iterator on the relation, fetching rows, and filtering the rows. If the grouping includes sorting, the rows that pass the filter tests are sorted on the group-by keys. If the grouping includes hashing, a hash is computed based on the group-by key values. The sorted or hashed rows are organized into sort or hash run structures. After all of the rows in the relation have been consumed, the row source iterator is closed and the grouped and aggregated rows are returned.

Large relations cause problems with current implementations of queries such as group-and aggregate. One problem is that the relation is so large that it does not fit in available memory, thus requiring many trips to disk to process portions that do fit in the available memory. The multiple trips to disk limit performance of the system to that of the disk system.

Another problem is that the cost of applying the filters on each of the rows in the relation may be prohibitive. If the selectivity of the filters is low, the number of rows returned by the operation is large, leading to cases in which some aggregation operations do not fit in available memory.

Yet another problem is that, if the number of groups resulting from the grouping operation is large, then constructing large hash or sort runs stresses the memory hierarchy of on-chip caches and memories.

One approach to solving the above problems is to execute portions of the group-and-aggregate query in parallel, by taking advantage of multi-threaded CPU cores, pools of server processes, or multi-node clustered configurations. Executing portions of the query in parallel also requires some technique for merging these operations into a final result.

Another approach is to off-load the processing of some of the operations involved in the group-and-aggregate operation to another system that is likely to perform the operations at a lower cost or to reduce the amount of data that the server process needs to process.

Heterogeneous Systems

For large relations, database systems can benefit from Heterogeneous Systems (HS). These systems are ones with a large number of disk-less compute nodes, each with its own main memory, and a high-speed interconnect among the nodes. As the number of nodes is very large, the amount of memory aggregated over all of the nodes is also very large. The database system using the HS has access to an in-memory representation of the relation in the HS and to persistent storage where the relation is stored.

Heterogeneous Systems are often organized in the form of a set of clusters of hierarchies, each cluster having a tree-like structure. Each leaf in the tree has a compute node and memory and is connected via switches that reside at multiple levels in the tree. Compute nodes in the hierarchy are built for both very efficient processing of a well-defined set of query primitives and low power consumption. The types of processors at each of the compute nodes can be different from processors elsewhere in the hierarchy or from processors in a database system that connects to the heterogeneous system.

In one embodiment, a hierarchy has 200 compute nodes and a total of 3 terabytes (TB) of memory distributed over the nodes. A cluster of four such hierarchies provide about 12 TB of working memory, which is sufficiently large for holding an in-memory copy of a large relation.

A heterogeneous system offers many benefits, such as a very high degree of parallelism, high throughput, and low power for operations, such as group-and-aggregate, on large relations. However, a heterogeneous system may have some functional limitations and cost-benefit tradeoffs in its use. One functional limitation is the inability to perform certain underlying functions needed by the group-and-aggregate operation. These functions include fetching the underlying row sources, supporting functions that use the key and column data types, and those that perform the particular aggregation specified. Lacking the ability to perform these underlying functions reduces the performance benefit of the heterogeneous system. Cost-benefit tradeoffs include comparison of the cost of loading portions of the relation into the heterogeneous system and collecting the results with the benefits of any improvement in the time and power consumed when the heterogeneous system assists in the group-and-aggregate operation. Additionally, because the heterogeneous system has no persistent storage for storing redo logs, the database system incurs a cost to assure transactional consistency.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An embodiment for performing the operation has two phases, a compile phase and an execution phase. During the compile phase, the database system determines the size of the operation on a given relation and whether the HS is capable of performing functions needed to assist in the operation. Also during this phase, the embodiment determines the costs of performing the operation with the assistance of the HS compared to the database system alone performing the operation. If the cost with the assistance of the HS is low enough compared to the cost of using the database system by itself, then the HS assists in the execution phase. In the execution phase, the database system activates a special row source during which the HS produces partial results, which are aggregated and merged and provided to the database system. After all of the partial results are merged, the database system performs checks and adjustments to assure transactional consistency, closes the row source, and returns the query result.

DESCRIPTION

General Overview

Assuming that the database had previously loaded the relation into the HS, which requires that the database system partition the relation and distribute the relation in a balanced manner among the compute nodes in the HS, an embodiment performs a sequence of checks to determine whether the HS is capable of assisting and whether the HS would improve the performance of the operation. These checks include the cost of performing the operation in the database system alone, the cost of performing the operation in a hierarchy of compute nodes, and the cost of merging the results from multiple hierarchies into a final result. If the checks indicate that the costs are sufficiently low, then the database system uses the HS in the operation. Otherwise, the database system performs the operation by itself.

If the database system does decide to use the HS, the database system prepares processes to produce and collect results from the HS. The database system then starts a special row source, which is an iterator over the relation on which the operation is to be performed. Producing results from the HS requires a set of processes be started in the HS under control of a scheduler. Collecting the results requires that the database system start a number of consumer processes, where the number of consumer processes depends on the degree of parallelism (DOP) supported by the database system and is adjusted to account for the degree of parallel execution in the HS. While active, each of the consumer processes expects to receive a certain number of payloads produced from the HS after which the consumer process completes. After all of the consumer processes finish, the database system determines whether any blocks are out of sync with the blocks in the database system. If so, the database system takes care of the transactional semantics to assure that transactional consistency for the out of sync blocks, after which the database system closes the special row source.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
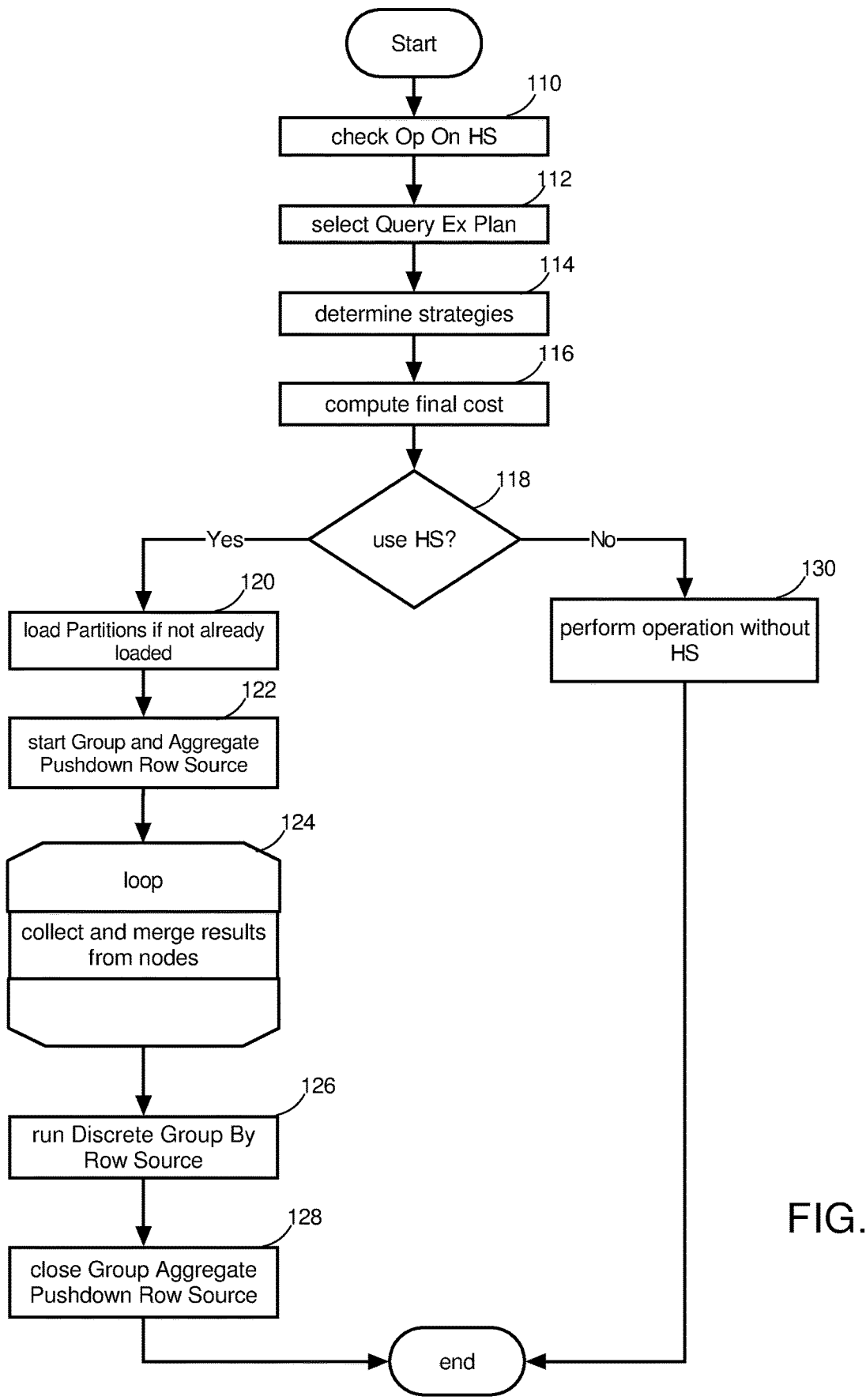
FIG. 1 depicts a flow chart of the major steps in processing a group-and-aggregate query in a heterogeneous system, such as the example system depicted in FIG. 10.

Referring to FIG. 1, the group-and-aggregate operation on a relation has two phases, the compile phase and the runtime phase, during which a number of steps are executed. During the compile phase, steps are performed that assist in determining whether the HS can be used and whether it is worth using. The steps performed are checkOpOnHS 110, selectQryExPln 112, determine strategies 114, and computeFinalCost 116. Each of these steps is described below. During the runtime phase, steps are performed that manage the operation in the HS, if the HS is assisting, as determined in step 118. Those steps include loadPartitions 120, startGroupAndAggregatePushdownRowSource 122, collect and merge results loop 124, run discreteGroupByRowSource 126, and closeGroupAggregatePushDownRowSource 128. If the HS is not assisting as determined in step 118, then the operation is performed in the database system in step 130.

Compile Phase

Figure 2:
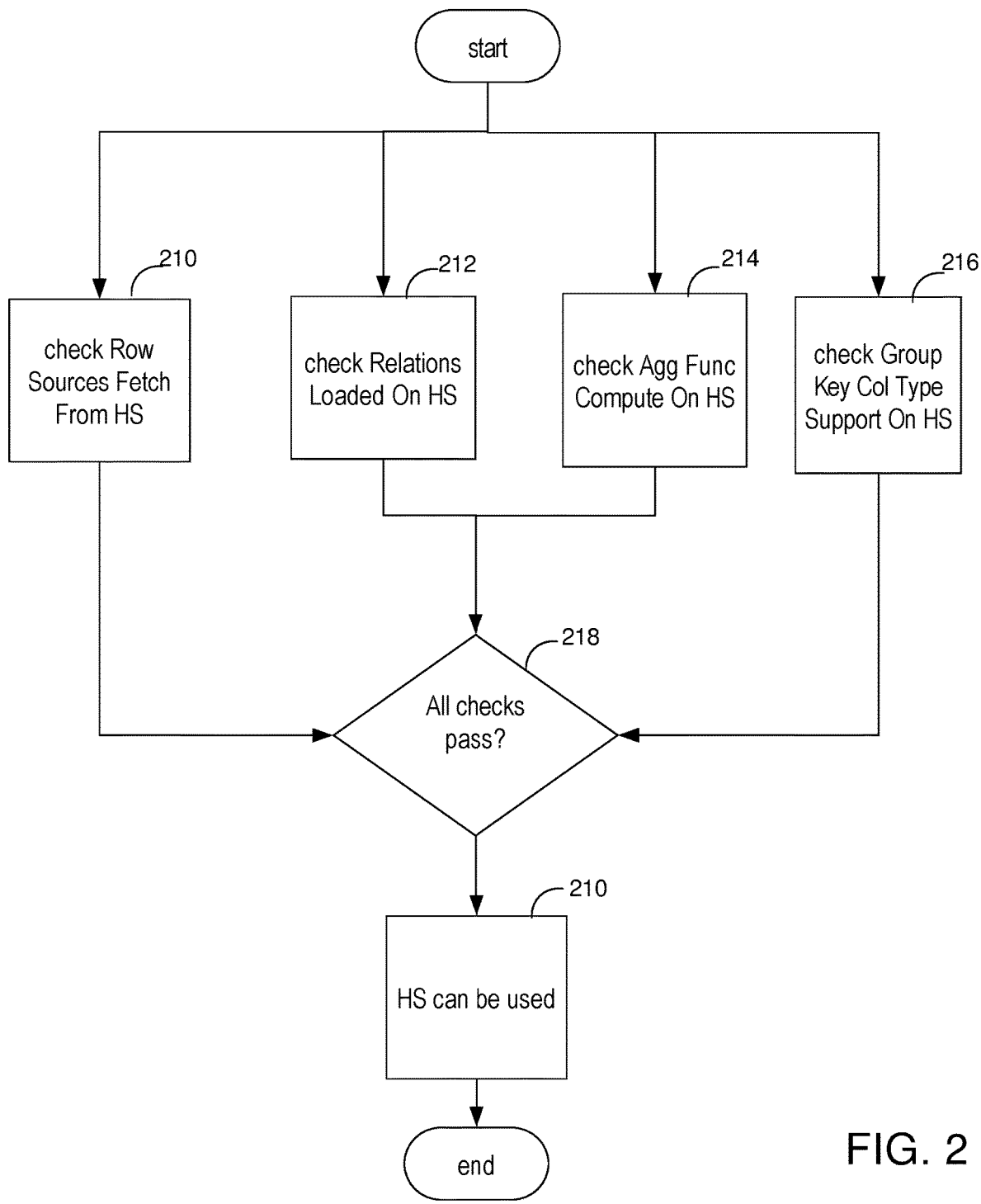
FIG. 2 depicts a flow chart of the check Op On HS step in FIG. 1.

FIG. 2 depicts steps involved in the checkOpOnHS step 110 of FIG. 1. The system checks, in step 210, to determine if the operation can run on the HS. In this step, the system checks recursively to decide whether the underlying row sources can be fetched from the HS. In step 216, the system checks whether the HS supports data types of the group-by keys and columns that are aggregated. In step 214, the system checks whether the HS can compute the aggregation functions, after a possible query rewrite. In step 212, the system checks to determine if relations are all loaded in the HS. For example, in the most simple case, when the underlying row source is a table scan, the compile-time checks determine whether HS can support data types in the filtered and projected columns, whether the filters can be evaluated in the system, and whether the relation, or the columns that are projected, selected, grouped-by and aggregate, are all loaded in the HS.

Figure 3:
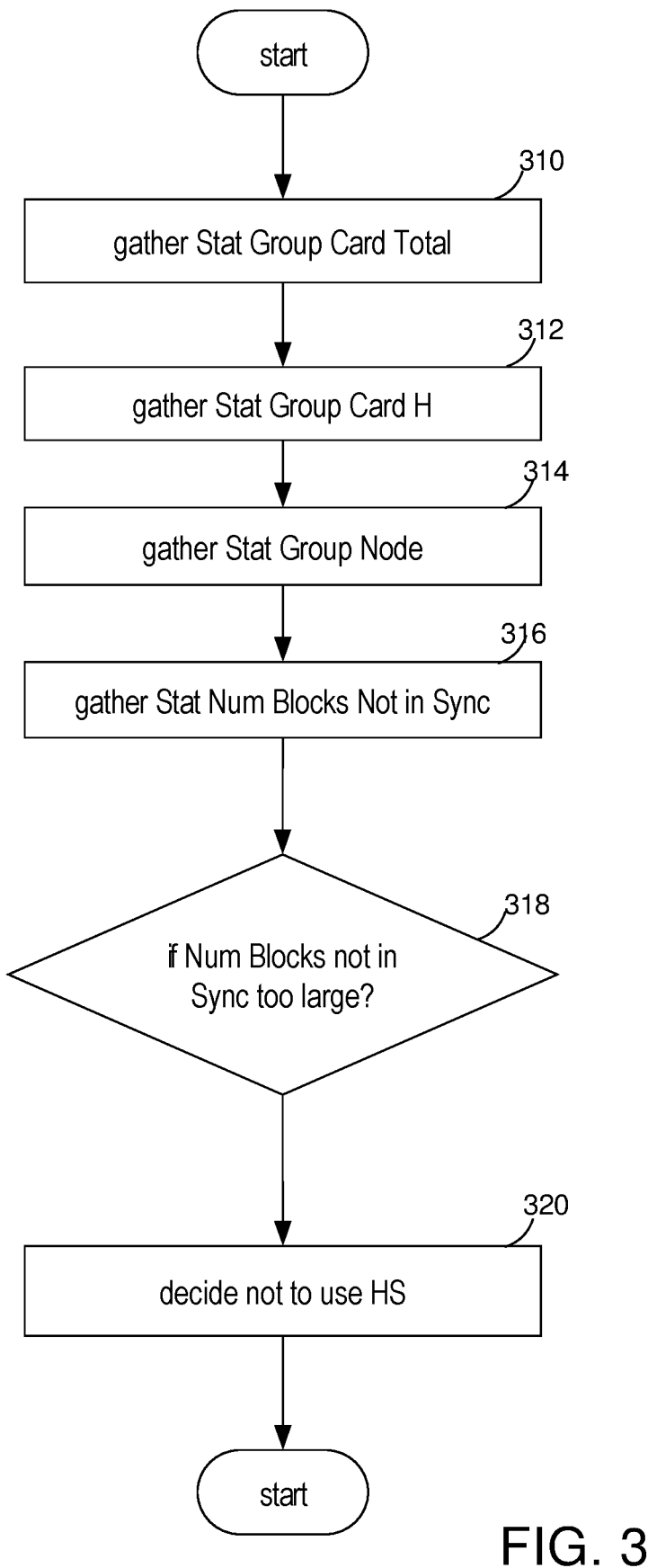
FIG. 3 depicts a flow chart of the select Query Execution Plan step in FIG. 1.

FIG. 3 depicts steps involved in the selectQryExPln step 112 of FIG. 1. The system gathers various statistics on the relation to be executed. The statistics include the size of the group (group-by cardinality), obtained in step 310, for the entire group-by relation, the size of the groups in each hierarchy H of the HS obtained in step 312, the size of the group for each node in the HS obtained in step 314. Statistics on group-by cardinality are needed to best determine the strategies used by both the database system and the HS, because group-by operations are very sensitive to the number of groups produced. Statistics also include the number of blocks in the relation, obtained in step 316, that are loaded in the HS but are not in sync with the database system. This statistic is vital for handling any transactional semantics after the execution of the operation. It is important to maintain a certain level of accuracy regarding the number of out-of-sync blocks. The statistics should indicate whether it is very likely that a majority of blocks, as determined in step 316, in database persistent storage have changed since the relation was last loaded into the HS. If so, as determined in step 318, the database system can decide that the HS should not be used, as in step 320, because the cost of maintaining transactional consistency is too high. In that case, the user can reload consistent data into the HS.

Strategies

Figure 4:
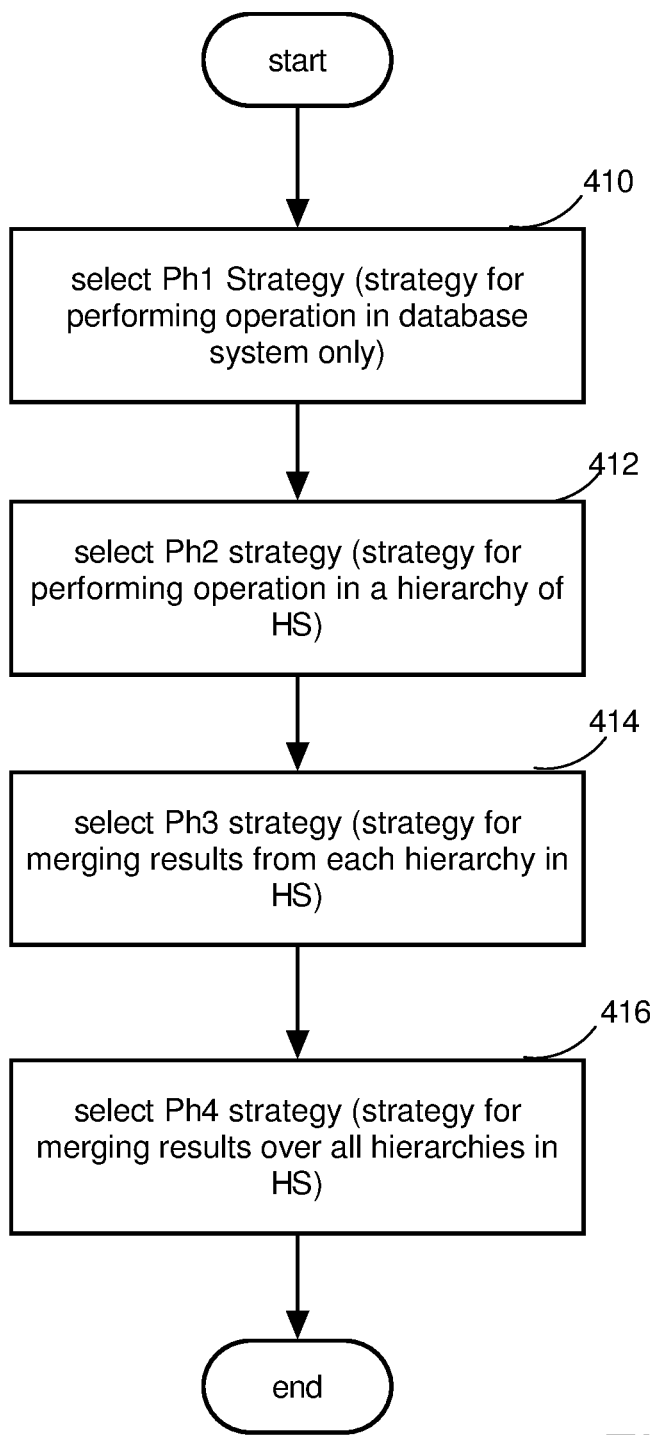
FIG. 4 depicts a flow chart of the determine strategies step in FIG. 1.

FIG. 4 depicts steps involved in the determineStrategies step 114 in FIG. 1. The system performs a number of calculations in sequence. These calculations are then used to compute a final cost based on which a final determination is made to use or not use the HS.

Ph1 Strategy

Figure 5:
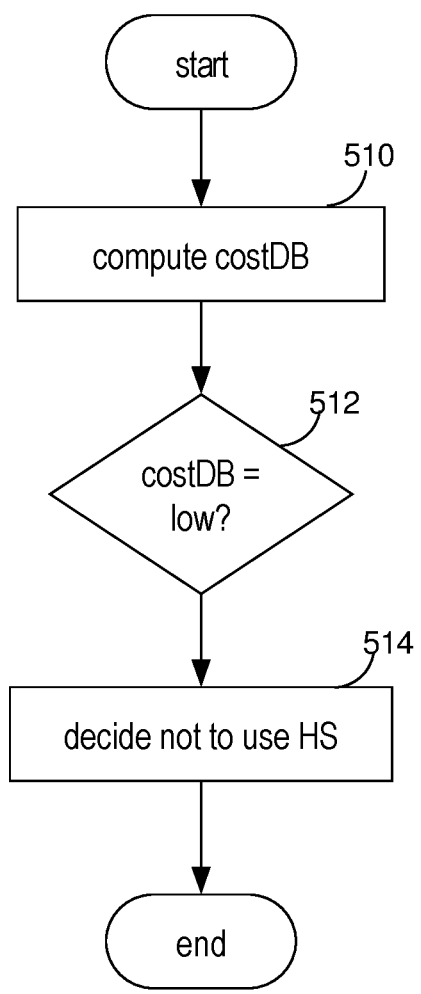
FIG. 5 depicts a flow chart of the select Ph1 strategy step in FIG. 4.

In the selectPh1Strategy step 410 in FIG. 4, the system decides on the best strategy for performing the group and aggregate operation in the database system only (i.e., without the assistance of the HS). FIG. 5 depicts steps involved in step 410. The step 510 in FIG. 5 computes the costDB value. If the cost is low as determined in step 512 of FIG. 5, the HS is not used as depicted in step 514. In one embodiment, costDB(tDB,powerDB)=tDB/powerDB, where tDB is the estimated time of executing the operation and powerDB is the power required to execute the operation.

The following Phase2-4 strategies determine the cost benefit tradeoffs of having the HS assist the database system.

Ph2 Strategy

In the step selectPh2Strategy 412 of FIG. 4, the system decides on the best strategy for performing the group-aggregate operation within each individual hierarchy of the HS. In an HS with multiple hierarchies, the strategy for each can be different. The phase2 strategy can be altered, so the strategy is considered a hint. The best plan is selected for each node, because the optimizer has information as to which portions of the HS have hardware accelerators for efficient operations such as sorting. For example, if a hierarchy has an accelerator for sorting, the optimizer can indicate to the hierarchy that it perform a sort-based aggregation, even though the database system chooses a hash based aggregation for itself. These plans and estimations on potential group-by cardinality reduction from intermediary aggregation (i.e., aggregation at non-leaf nodes from the second phase) are used to drive the selection of plans for merging results from hierarchies to produce the final result for the HS in phase 3.

Figure 6:
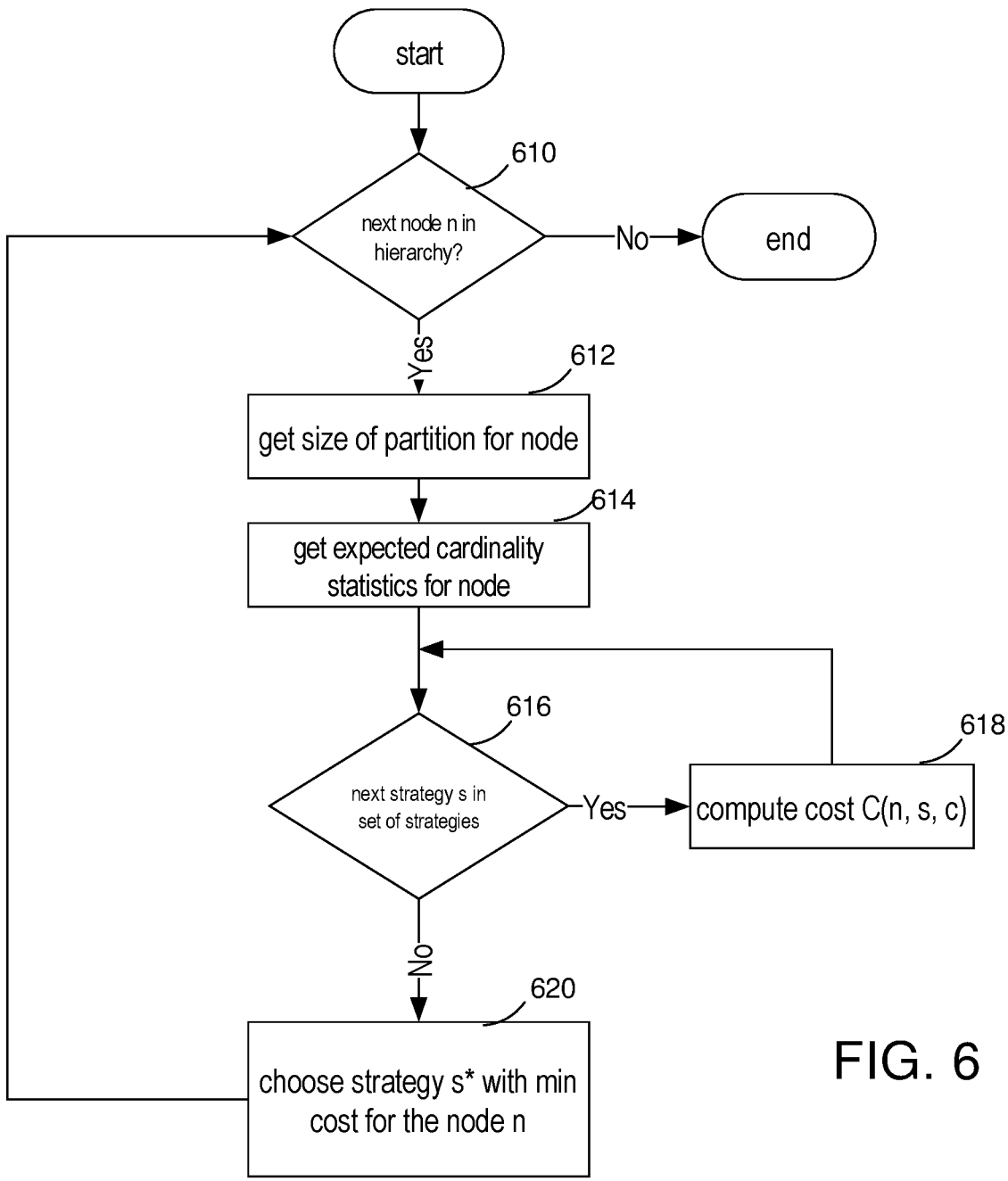
FIG. 6 depicts a flow chart of the select Ph2 strategy step in FIG. 4.

FIG. 6 depicts, in one embodiment, an algorithm for phase2 that includes the steps of, for each node n in the hierarchy as determined in step 610, obtaining the size sz of the partition in the node n in step 612, reading the expected cardinality statistics c for the node n in step 614, and for each candidate strategy s in Phase 2 as determined in step 616, computing the cost C(n,s,c, powern) for node n in step 618, and comparing all of the costs to select, in step 620, the strategy s* that minimizes the cost C(n,s,c, powern).

In one embodiment, the cost $$C(n, s, c) = \frac{T - \text{Phase2}(s, c) \cdot sz}{\text{powern}},$$

where powern is the power requirement for the node n and T—Phase2(s, c) is the time of phase 2 assuming strategy s and cardinality c. The algorithm then returns the optimized strategy, s*.

Ph3 Strategy

In the selectPh3Strategy step 414 of FIG. 4, the system decides on the best strategy for merging results produced from the nodes in each hierarchy within the HS based on the results in the second phase to create a single result from each hierarchy. This phase considers the very high degree of parallelism inherent in the large number of nodes in a HS, the number of producer processes that the database system can handle, and the number of cores in multi-core compute nodes.

Figure 7:
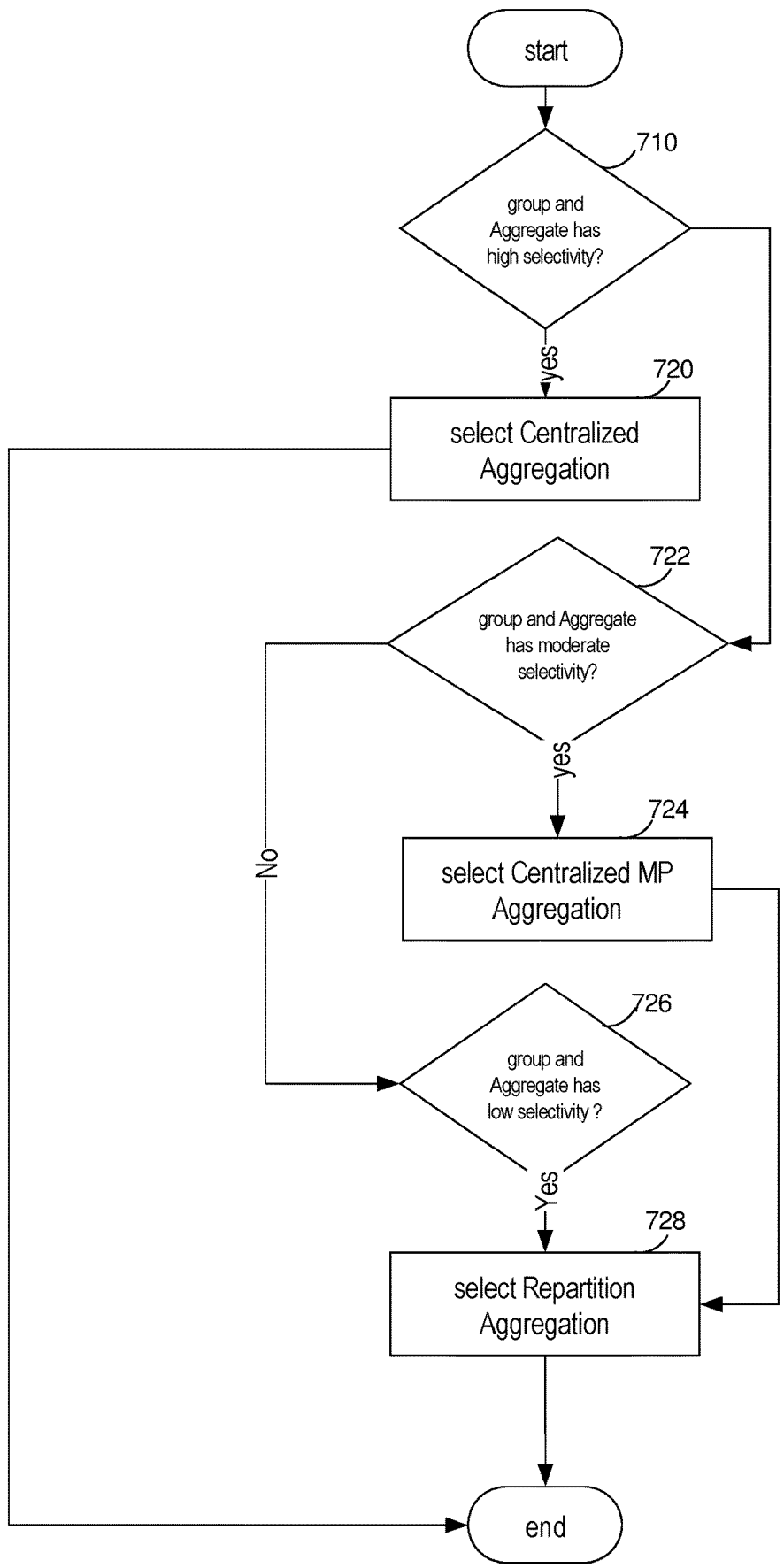
FIG. 7 depicts a flow chart of the select Ph3 strategy step in FIG. 4.

FIG. 7 depicts, in one embodiment, how Phase 3 evaluates a Centralized Aggregation strategy, a centralized multi-phase aggregation strategy, and a Repartition Aggregation strategy and then selects among them depending on the selectivity of the group-and aggregate operation. If the group-and-aggregate is estimated to be highly selective as determined in step 710, then the Centralized Aggregation strategy is selected in step 720. If the selectivity is medium as determined in step 722, then the Centralized Multi-Phase Aggregation strategy is selected in step 724. If the selectivity is low as determined in step 726, then the Repartition Aggregation strategy is selected in step 728.

In the Centralized Aggregation Strategy, each leaf node in the HS aggregates its data and sends the aggregated data to its parent node. Intermediate nodes in HS just relay the data and the root node acts as the final merging stage.

In the Centralized Multi-phase Aggregation strategy, each leaf node in HS aggregates its data and sends the aggregated data to its parent node. Intermediate nodes aggregate data from their child nodes. This algorithm has a potential advantage over the Centralized Aggregation algorithm if the intermediate aggregate reduces the group cardinality.

In the Repartition Algorithm, each leaf node aggregates its data and then partition and redistributes the results to the leaf nodes based on an agreed-upon scheme such that no groups with the same keys from different leaf nodes are merged by separate leaf nodes. Each leaf node then sends its final results to the expected consumer.

Ph4 Strategy

In step 416 of FIG. 4, the optimizer considers plans for merging results coming from nodes in different hierarchies, where the number of nodes is much higher than: the typical number of nodes in a distributed cluster, the typical number of nodes in producer/consumer processes that execute in parallel in the database system along, and the typical number of cores in multi-core systems tuned for scalable aggregation.

Figure 8:
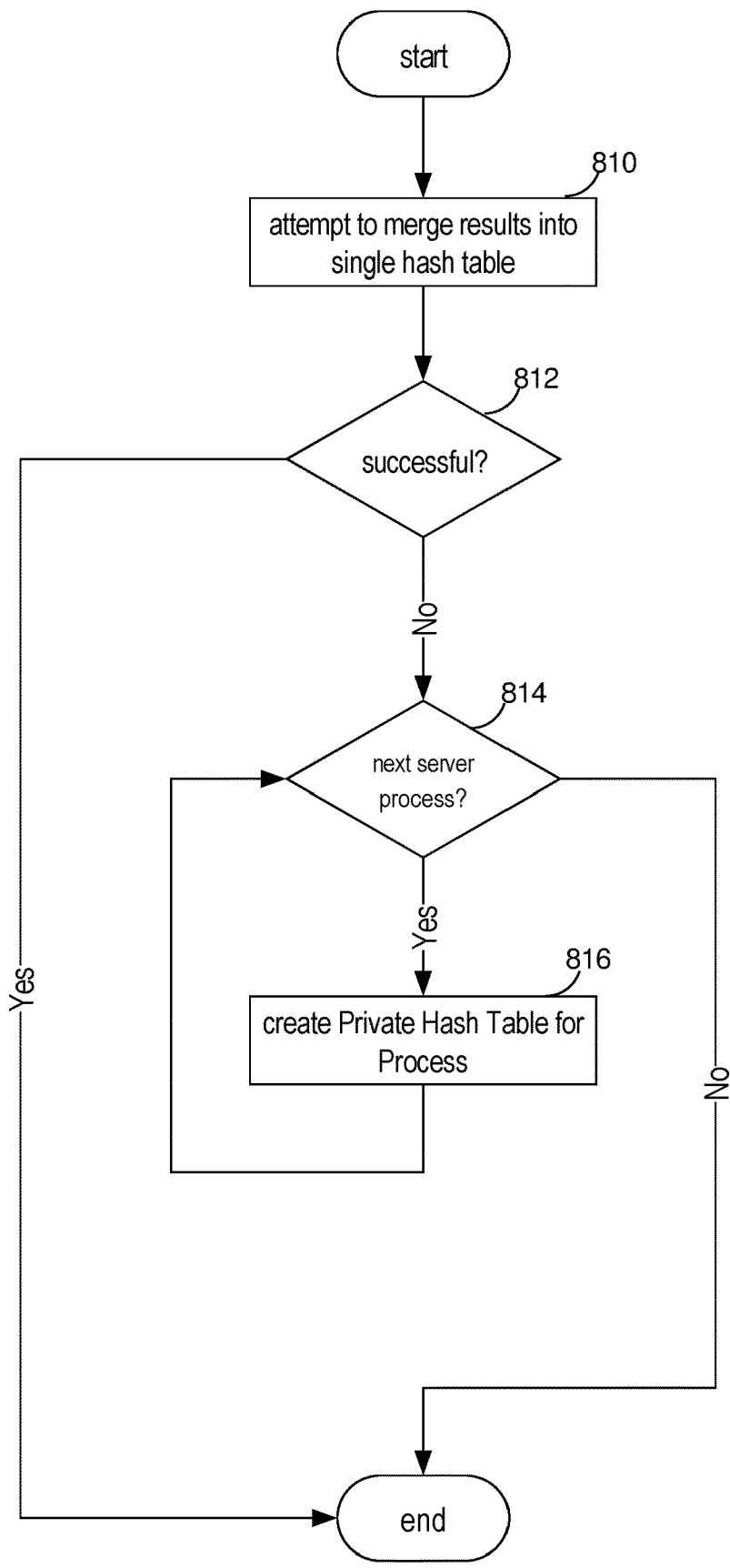
FIG. 8 depicts a flow chart of the select Ph4 strategy step in FIG. 4

More specifically, the system uses the results from phase 3 to decide on the best overall strategy for merging results from each hierarchy of the HS to produce the total HS result. FIG. 8 depicts steps involved in step 416. In step 810 of FIG. 8 determines whether the HS can merge the results into a single hash table. If so, then the system does so. If not, the system creates a private hash table for each server process, as depicted in steps 814 and 816. These tables can be adjusted in the dispatchConsumerProc step, discussed below.

Breaking the selection and cost functions into phases described above observes the natural dependencies among these phases and helps to modularize the optimizer code that runs during compilation.

Compute Final Cost

In the computeFinalCost step, the system computes the cost, costHet, to perform the operation with the assistance of the HS, determined by the Ph2-Ph4 strategy steps, and compares it with the cost of computing the operation in the database system alone determined in the Ph1 strategy step. If the cost of operating with the HS is lower than the cost using the database system alone, then the HS assists in the execution of the operation. The details of the final cost calculation are described below. If the cost costHet is less than the costDB, then the system proceeds with the assistance of the HS, otherwise it uses only the database system.

Execution

During the execution phase, steps are executed to manage the production and consumption of results when the HS is used. The steps include loadPartitions 120 in FIG. 1, startGroupAggPushDownRowSource 122, run loop to Collect And Merge Results from Nodes 124, runDiscreteGroupByRowSource 126, and closeGroupAggPushDownRowSource 128. Each of these steps is described below.

In the loadPartitions step 120, the system partitions and loads the relation among the nodes in the HS if the relation has not already been loaded into the HS in step 212 of FIG. 2. The step 120 uses statistics to determine the optimum range-based partitioning of the data. Partitioning among the node is based on the group-by keys. If histogram statistics on the group-by relation are not available, the statistics are gathered. Even though gathering the statistics can be costly, it is not done that often because the query has low rates of data insertion or updates. The HS loads the data in the same range on leaf-nodes that share the same immediate switch or parent node. Loading data in this manner minimizes the number of groups that are common to distinct switch nodes, which minimizes the number of merges at intermediary levels in the HS, before data is sent back to the database system.

In the startGroupAggPushDownRowSource step 122 of FIG. 1, the system activates the new group and aggregate row source. After the row source is started, the database system enters a loop 124 during which payloads (i.e., messages consisting) of groups and corresponding aggregates are requested from the HS and consumed in the database system. This flow of payloads from the HS to the database system is governed by a set of producer processes in the HS that produce the payloads and a set of consumer processes in the database system that consume the payloads. The set of producer processes in the HS is further governed by the partitioning of the relation in the HS during the loadRoutine step and controlled by a scheduler in the HS. In one embodiment, producer processes in the HS are based on priority queues such that each group-and-aggregate operation is broken into multiple producer processes, which are all queued at potentially different priorities. In the embodiment, the number of consumer processes in the database system is set to match the partitioning of the relation in the HS. The new row source guarantees that the consumer processes can process a certain number of groups, along with their aggregates. The load balancing between the producer processes and the consumer processes is dynamic so that the database system can adjust to the high rate and possibly unbalanced sizes of the payloads from the different producer processes in the HS.

Figure 9:
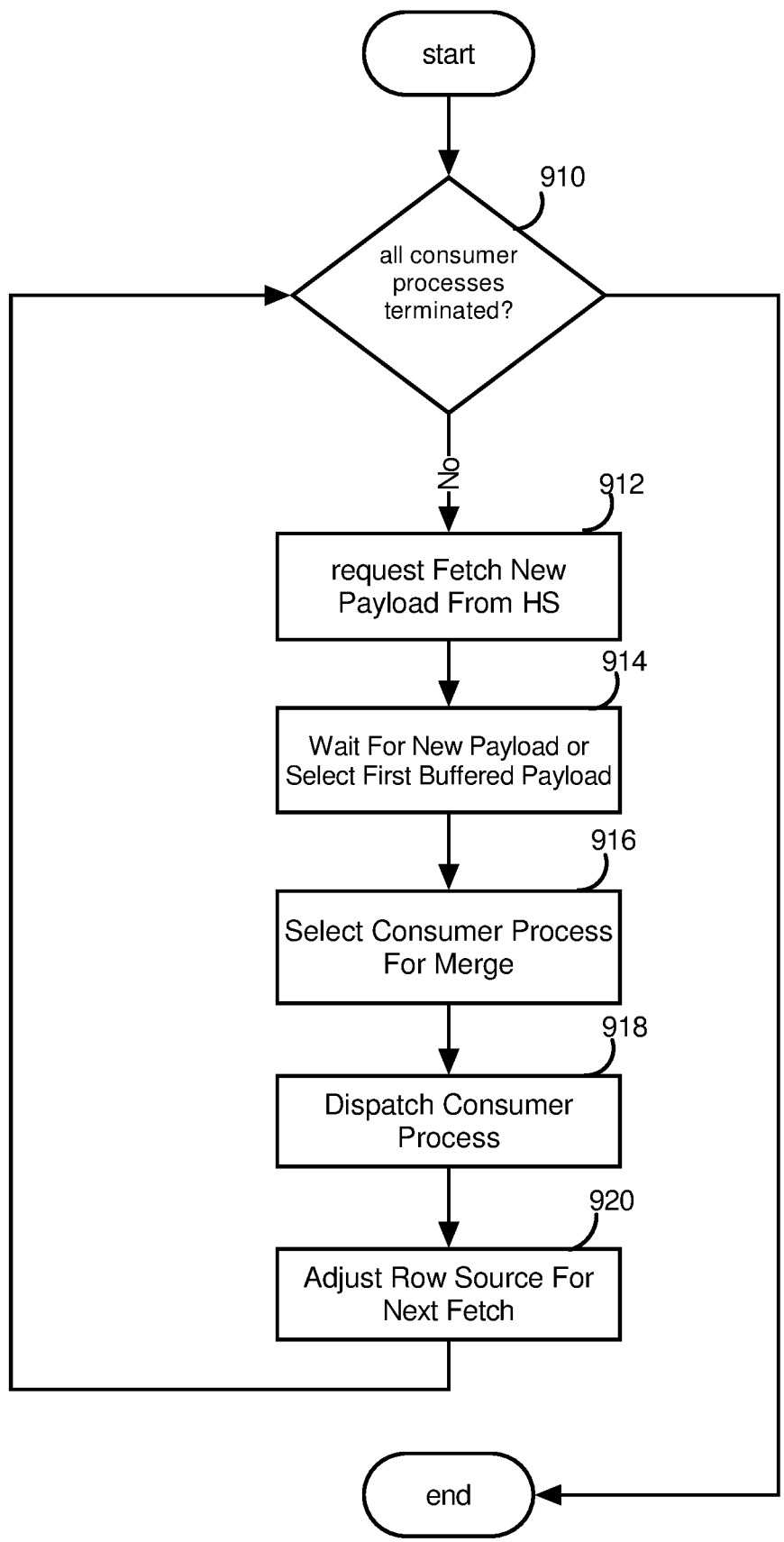
FIG. 9 depicts a flow chart of loop step in FIG. 1.

The steps that govern the flow of payloads from the HS to the database system are depicted in FIG. 9 and include the following requestFetchNewPayLoadFromHS 912, waitForNewPayloadOrSelectFirstBuffed 914, selectConsumerProcForMerge 916, dispatchConsumerProc 918, adjustRowSourceForNextFetch 920.

The requestFetchNewPayLoadFromHS step 912 in FIG. 9 makes a request for a new payload from the HS, which produces payloads for the row source.

The step waitForNewPayloadOrSelectFirstBuffed 914 in FIG. 9 waits for the production of a new payload from the HS as the payloads become available. When a buffered payload is available, the step then selects the buffered payload.

The step selectConsumerProcForMerge 916 in FIG. 9 determines which of the consumer processes running on the database system should merge the payload into the global results.

Figure 10:
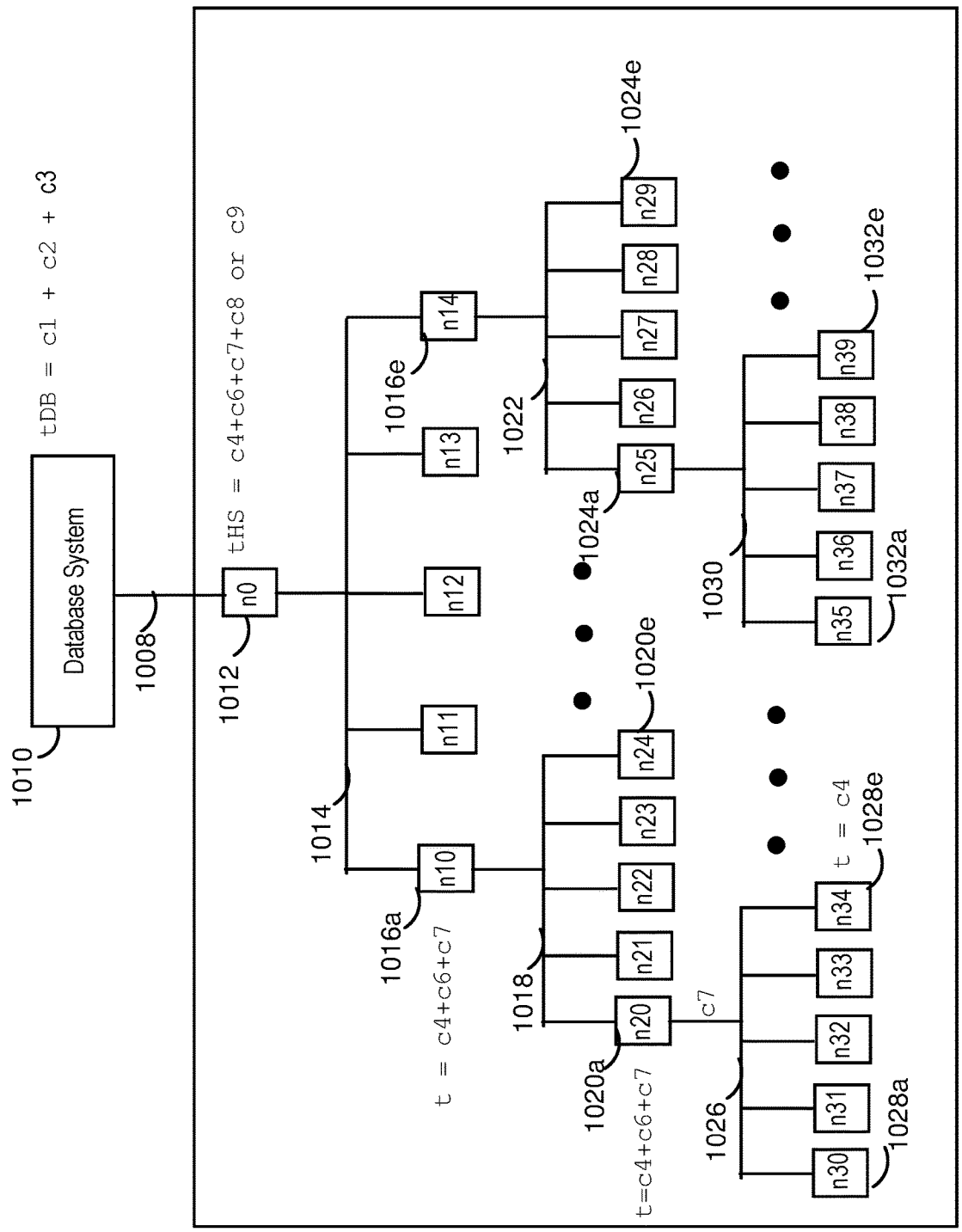
FIG. 10 depicts an example system in which an embodiment operates.

FIG. 10 depicts steps involved in the dispatchConsumerProc step 918 in FIG. 9. The database system dispatches the consumer processes for fetched payload processing. In the step, the system monitors the run time to determine whether the performance expectations of the HS are occurring. If the run time statistics indicate that the performance is low as in step 1010 in FIG. 10, then the system creates new tables in step 1012. If the size of the private hash table ph is too large as determined in step 1014, then the partition distribute module is run in step 1016. If the size of the private hash table is greater than a threshold as determined in step 1018, then the private hash table is synchronized with the shared table in step 1020 and the hit frequency is maintained in step 1022. If the single hash table is used (hs is true), then the system creates a shared table in step 1026.

The adjustRowSourceForNextFetch step 920 in FIG. 9 adjusts the row-source guarantee for the next fetch to manage flow control between the producers in the HS and the consumers in the database system.

After all of the payloads have been produced and consumed as determined in step 910, the loop ends and the step discreteGroupByRowSource step 126 in FIG. 1 checks to determine the blocks that are not in sync with persistent storage in the database system. For those blocks that are not in sync, the function starts a row source to handle these blocks.

After the database system has processed all of the payloads and merged into the result any out of sync blocks, the closeGroupAggPushDownRowSource step 128 in FIG. 1 is executed to close the new row source.

Cost Model

The cost model is built upon the parameters in the table below and FIG. 10 depicts various costs incurred in the hierarchical system. In FIG. 10, the database system 1010 is coupled via link 1008 to the hierarchical system, which includes nodes n0 1012, n10-14 (1016a-e), nodes n20-24 (1020a-e), nodes n25-29 (1024a-e), nodes n30-34 (1028a-e), and nodes n35-n39 (1032a-e). As depicted, nodes n30-34 are coupled via interconnect 1026 to parent node n20. Nodes n35-n39 are coupled via interconnect 1030 to parent node n25. Nodes n20-24 are coupled via interconnect 1018 to parent node n10; and node n24-n29 are coupled via interconnect 1022 to parent node n14. Other nodes, such as n21-24, n26-29 and n1-n13 can be parent nodes as well.

| Parameter | Definition | Meaning |
|---|---|---|
| R |  | the relation |
| N |  | number of nodes in HS |
| N2 |  | number of intermediate nodes in merge |
| Rn |  | relation partition on node n |
| card(R) |  | size of relation R |
| card(R)/N |  | size of relation per node |
| card(Rn) |  | cardinality of partitioned relation |
| DOP |  | degree of parallelism among producers and consumer processes |
| records | card(R)/DOP | size of relation per process |
| f | card(groupsK in R) ÷ (card(R)/N) | reduction factor (selectivity of query) |
| xDB |  | rate of processing records in DB |
| LDB |  | latency of communication between producers and consumers |
| L |  | interconnect latency |
| L2 |  | latency of communication between nodes |
| powerDB |  | estimated power requirement for DB |
| powerHS |  | estimate power requirement for HS |
| c1 | xDB · records | time to process in DB |
| c2 | LDB · f · records | latency to transfer data between producers and consumers |
| c3 | xDB · f · records | time for consumers to produce final results |
| X |  | processing rate in node |
| Y |  | merging rate of a node |
| c4 | X/N · card(R) | time for a node to process its partition |
| c5 | Y · f · card(R) | time for a node to merge results if merging with a single merger node |
| c6 | Y/N2 · f · card(R) | time for a node to merge results if merging across multiple (N2) intermediate nodes |
| c7 | L · f · card(R) | time to transmit results over interconnect |
| c8 | xDB · f · card(R) | time to merge in DB |
| c9 | L2/N2 · f | alternative latency |

The computeFinalCost step calculates the cost of performing the operation in the database system alone or with the assistance of the HS, based on a number of primary inputs and derived values. The time to produce results in the database system, 1010 in FIG. 10, alone is $$tDB = c1 + c2 + c3.$$

The cost for performing the operation with the assistance of the HS is
tHS=c4+c6+c7+c8, as depicted for node n0 1012. Alternatively, the cost with the assistance of the HS is
tHS1=c4+c6+c7+c9, as depicted for node n0 1012, if the alternative latency c9 is used.
The cost costHS of using the assistance of the HS is then $$costHS = tHS \text{ or } tHS1/powerHS.$$

The optimizer decides to use the HS if costHS<costDB. Thus, the decision is based on performance per unit of power.

In practice the DOP for database execution, is on the order of 10 to 100 times smaller than the degree of parallelism in the HS and 10 times smaller than the degree of parallelism among the merging nodes. If the HS exhibits a 10 times improvement in performance per unit of power to process the group-and-aggregate operation, i.e., if $$\frac{xDB}{powerDB} / \frac{X}{powerHS} \sim 10$$

then the cost optimizer chooses the HS if $$\frac{LDB}{DOP} > \left(\frac{Y}{N2} + L\right) * \frac{powerDB}{powerHS} \text{ and } (1+f) * \frac{xDB}{DOP} > \frac{X}{N} * \frac{powerDB}{powerHS}$$

The first inequality is highly dependent on the specific interconnect latencies, and the second inequality is highly dependent on the parameter f.

For small f, i.e., for the case of very selective group-and-aggregate queries, it more likely that the second inequality is met. This is the case when the overall latency of merging a small number of groups across the N2 nodes and transmitting the final result over a fast interconnect is expected to be no larger than the overhead of merging final results across DOP potentially more powerful nodes.

For large f, i.e., for the case of low selectivity queries, the latency over the interconnect is likely to dominate the latency LDB, because there is no data reduction between nodes N and N2 or between N2 and the database system. In this case, the optimizer should make the decision not to use the assistance of the HS.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
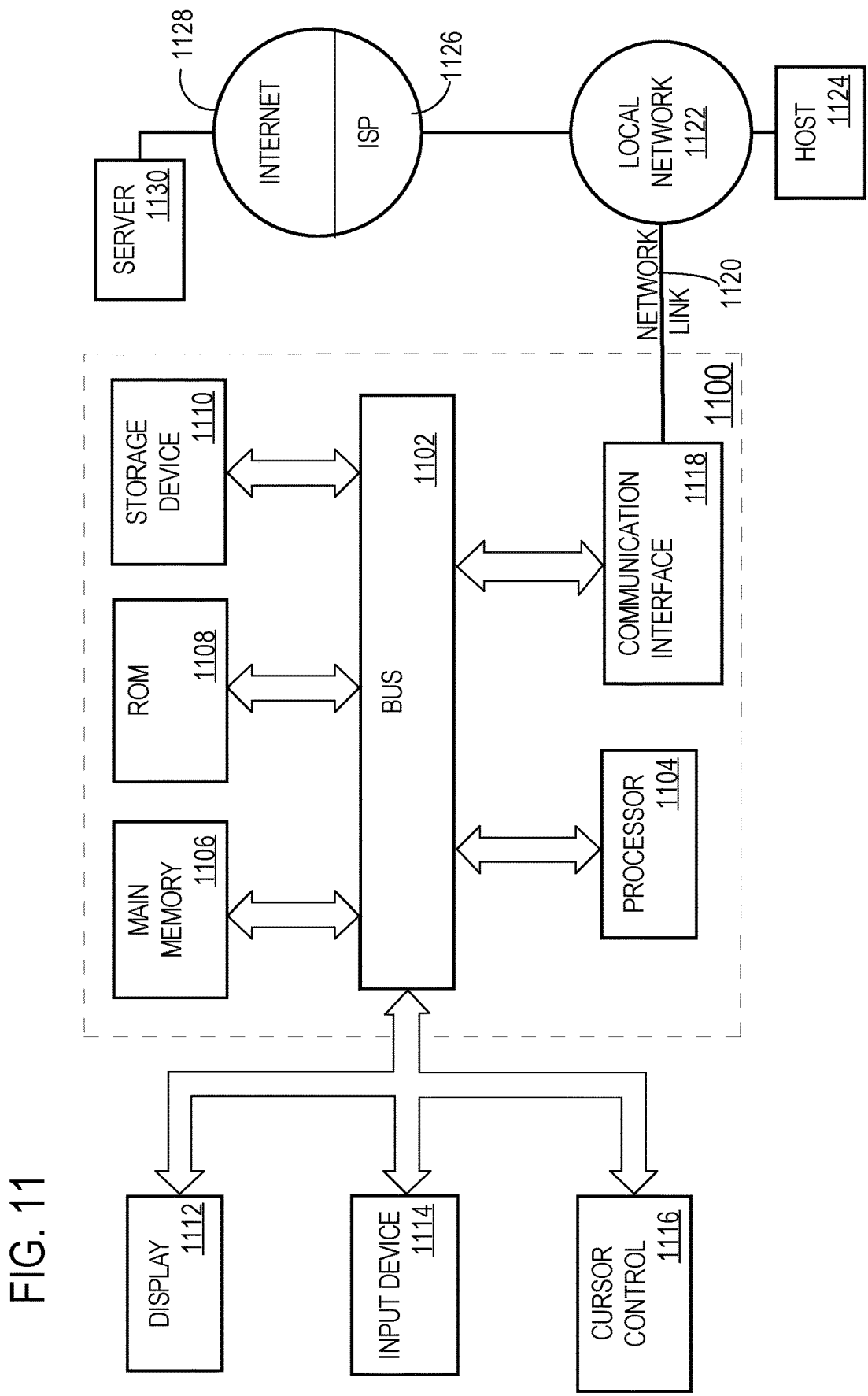
FIG. 11 depicts an example computer system.

For example, FIG. 11 is a block diagram that depicts a computer system 1100 upon which an embodiment may be implemented. Computer system 1100 includes a bus 1102 or other communication mechanism for communicating information, and a hardware processor 1104 coupled with bus 1102 for processing information. Hardware processor 1104 may be, for example, a general-purpose microprocessor.

Computer system 1100 also includes a main memory 1106, such as a random access memory (RAM) or other dynamic storage device, coupled to bus 1102 for storing information and instructions to be executed by processor

1104. Main memory 1106 also may be used for storing temporary variables or other intermediate information during execution of instructions to be executed by processor 1104. Such instructions, when stored in non-transitory storage media accessible to processor 1104, convert computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1002 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing an in-memory copy of a relational table of a database system in an external system that comprises a plurality of computers that do not host the database system;
   receiving, by the database system, a query that references the relational table;
   counting data blocks of the in-memory copy of the relational table in the external system that are out of sync with data blocks of the relational table in the database system;
   deciding, based on said counting data blocks that are out of sync, to execute the query with assistance of the external system;
   receiving, by a first row source, partial results from the external system for said query;
   handling, by a second row source, data blocks that are out of sync; and
   returning a result that
      is based on the first row source and the second row source.

2. The method of claim 1 wherein said deciding to execute the query with the assistance of the external system comprises detecting that a first cost of executing the query without the assistance of the external system exceeds a second cost of executing the query with the assistance of the external system.

3. The method of claim 1 wherein said deciding to execute the query with the assistance of the external system is further based on a size of the plurality of computers.

4. The method of claim 1 wherein said deciding to execute the query with the assistance of the external system is further based on a size of the relational table.

5. The method of claim 1 wherein said deciding to execute the query with the assistance of the external system is further based on a selectivity of the query.

6. The method of claim 1 wherein said deciding to execute the query with the assistance of the external system is further based on a merging rate of a computer of the plurality of computers in the external system.

7. The method of claim 1 wherein said deciding to execute the query with the assistance of the external system is further based on a rate of processing records in the database system.

8. The method of claim 1 wherein said deciding to execute the query with the assistance of the external system is further based on a count of intermediate computers in the plurality of computers.

9. The method of claim 1 wherein said deciding to execute the query with the assistance of the external system is further based on a communication latency within the plurality of computers.

10. The method of claim 1 wherein said deciding to execute the query with the assistance of the external system is further based on estimated power consumption by at least one selected from the group consisting of: the database system and the external system.

11. One or more non-transitory computer-readable media storing instructions that, when executed by one or more processors, cause:
   storing an in-memory copy of a relational table of a database system in an external system that comprises a plurality of computers that do not host the database system;
   receiving, by the database system, a query that references the relational table;
   counting data blocks of the in-memory copy of the relational table in the external system that are out of sync with data blocks of the relational table in the database system;
   deciding, based on said counting data blocks that are out of sync, to execute the query with assistance of the external system;
   receiving, by a first row source, partial results from the external system for said query;
   handling, by a second row source, data blocks that are out of sync; and
   returning a result that
      is based on the first row source and the second row source.

12. The one or more non-transitory computer-readable media of claim 11 wherein said deciding to execute the query with the assistance of the external system comprises detecting that a first cost of executing the query without the assistance of the external system exceeds a second cost of executing the query with the assistance of the external system.

13. The one or more non-transitory computer-readable media of claim 11 wherein said deciding to execute the query with the assistance of the external system is further based on a size of the plurality of computers.

14. The one or more non-transitory computer-readable media of claim 11 wherein said deciding to execute the query with the assistance of the external system is further based on a size of the relational table.

15. The one or more non-transitory computer-readable media of claim 11 wherein said deciding to execute the query with the assistance of the external system is further based on a selectivity of the query.

16. The one or more non-transitory computer-readable media of claim 11 wherein said deciding to execute the query with the assistance of the external system is further based on a merging rate of a computer of the plurality of computers in the external system.

17. The one or more non-transitory computer-readable media of claim 11 wherein said deciding to execute the query with the assistance of the external system is further based on a rate of processing records in the database system.

18. The one or more non-transitory computer-readable media of claim 11 wherein said deciding to execute the query with the assistance of the external system is further based on a count of intermediate computers in the plurality of computers.

19. The one or more non-transitory computer-readable media of claim 11 wherein said deciding to execute the query with the assistance of the external system is further based on a communication latency within the plurality of computers.

20. The one or more non-transitory computer-readable media of claim 11 wherein said deciding to execute the query with the assistance of the external system is further based on estimated power consumption by at least one selected from the group consisting of: the database system and the external system.

* * * * *

UNITED STATES PATENT AND TRADEMARK OFFICE
CERTIFICATE OF CORRECTION

PATENT NO. : 11,126,626 B2  
APPLICATION NO. : 16/272829  
DATED : September 21, 2021  
INVENTOR(S) : Petride et al.

Page 1 of 1

It is certified that error appears in the above-identified patent and that said Letters Patent is hereby corrected as shown below:

On the Title Page

Column 1, item (73) Assignee, Line 2, delete "Redwood Shores (CA)" and insert -- Redwood Shores, CA (US) --, therefor.

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*